United States Patent [19]

Back

[11] Patent Number: 4,502,860
[45] Date of Patent: Mar. 5, 1985

[54] BIS-1:2-CHROMIUM COMPLEXES OF DISAZO DYES, AND THEIR PREPARATION AND USE

[75] Inventor: Gerhard Back, Lörrach, Fed. Rep. of Germany

[73] Assignee: Ciba-Geigy Corporation, Ardsley, N.Y.

[21] Appl. No.: 505,646

[22] Filed: Jun. 20, 1983

[30] Foreign Application Priority Data

Jul. 2, 1982 [CH] Switzerland .................. 4052/82

[51] Int. Cl.³ .................................. C09B 45/26
[52] U.S. Cl. ........................................... 8/437; 8/685; 8/681; 8/687; 8/917; 8/924; 534/695; 534/697; 534/699
[58] Field of Search ............... 8/437, 685; 260/145 A, 260/145 C, 148, 149

[56] References Cited

U.S. PATENT DOCUMENTS

| | | | |
|---|---|---|---|
| 3,975,369 | 8/1976 | Wicki | 260/145 B |
| 4,013,630 | 3/1977 | Beffa et al. | 260/145 A |
| 4,120,854 | 10/1978 | Wicki | 260/145 C |
| 4,311,641 | 1/1982 | Beffa | 260/145 A |
| 4,314,937 | 2/1982 | Beffa | 260/145 A |
| 4,331,596 | 5/1982 | Beffa et al. | 260/145 A |
| 4,396,544 | 8/1983 | Dore | 260/145 A |

FOREIGN PATENT DOCUMENTS 82117 6/1983 European Pat. Off. .
2059986 4/1981 United Kingdom .

*Primary Examiner*—A. Lionel Clingman
*Attorney, Agent, or Firm*—Edward McC. Roberts

[57] ABSTRACT

Dyes of the formula I

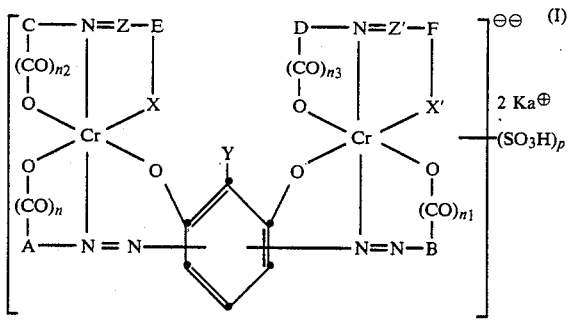

in which A, B, C, D, E, F, Z, Z', X, X', n, $n_1$, $n_2$ and $n_3$, p and Ka⊕ are as defined in claim 1, are particularly suitable for dyeing wool or polyamide and especially leather.

15 Claims, No Drawings

BIS-1:2-CHROMIUM COMPLEXES OF DISAZO DYES, AND THEIR PREPARATION AND USE

Bis-1:2-chromium complexes of disazo, dyes, and their preparation and use

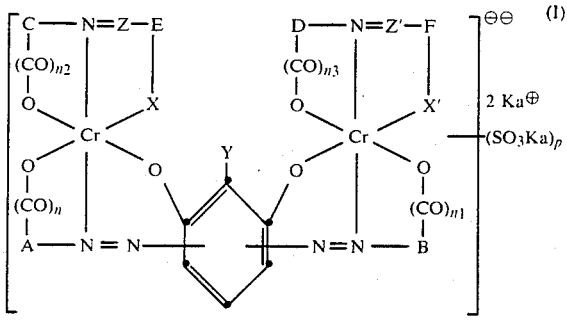

in which Z and Z', independently of each other, each are nitrogen or a —CH group, X and X', independently of each other, each are oxygen or a group of the formula —NR—, in which R is hydrogen or $C_1$–$C_4$-alkyl, but X and X' have to be oxygen when Z or Z' respectively is the —CH group, A and B, independently of each other, each are the radical of a diazo component of the benzene or naphthalene series which carries the hydroxyl or carboxyl group in o-position relative to the azo group, C and D, independently of each other, each are a radical of the benzene or naphthalene series which carries a hydroxyl or carboxyl group in o-position relative to the azo or azomethine group, or, if $n_2$ and/or $n_3 = 1$ and Z is a —CH group, the radical of an aliphatic, cycloaliphatic or aromatic aminocarboxylic acid, E and F, independently of each other, each are the radical of a coupling component when Z is nitrogen, the coupling component containing the group X or X' in o- or α-position relative to the azo group, or the radical of an o-hydroxyaldehyde when Z is the —CH group, Y is $C_1$–$C_4$-alkyl or hydrogen, n, $n_1$, $n_2$ and $n_3$, independently of one another, each are 0 or 1, p is an integer from 1 to 6, and $Ka^\oplus$ is a cation.

In the novel chromium complex dyes of the above formula I, the radicals A, B, C and D can carry a further one or more substituents, for example low molecular weight alkyl or alkoxy, halogen, for example chlorine or bromine, nitro, cyano, sulfo, carboxyl, phosphono, alkylsulfonyl, for example methylsulfonyl, sulfamides, for example sulfamide or N-methylsulfamide, or acylamino. Low molecular weight alkyl or alkoxy groups are to be generally understood as meaning in this Application those which have 1 to 6, preferably 1 or 2, C atoms, and "acylamino" refers to low molecular weight alkanoylamino, alkylsulfonylamino and alkoxycarbonylamino radicals and to sulfonylamino, aroylamino and arylsulfonylamino radicals.

The radicals A, B, C and D derive from, for example, the following amines: anthranilic acid, 4- or 5-chloroanthranilic acid, 4- or 5-sulfoanthranilic acid, 2-amino-3-naphthoic acid, 2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetyl-amino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 1-hydroxy-2-aminobenzene-4-sulfoanthranilide, 4-methoxy-2-amino-1-hydroxybenzene, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid or 2-amino-1-hydroxybenzene-4,6-disulfonic acid.

Apart from the hydroxyl-containing amines mentioned above, A, B, C and D can also be methoxy-containing amines or hydroxyl-containing amines whose hydroxyl group has been tosylated, such as anisidine, 4- or 5-chloroanisidine, 4- or 5-nitroanisidine, anisidine-4- or -5-sulfonic acid, or tosylated 1-hydroxy-2-aminobenzene, and the methoxy or O-tosyl group is converted into an OH group before or in the course of the metallisation. Compounds having these groups are primarily used when the corresponding 1-hydroxy-2-amino compounds have poor coupling properties.

C and/or D, if $n_2$ and/or $n_3$ is equal to 1 and Z is a —CH group, can also be the radical of an aliphatic or cycloaliphatic aminoacid. Examples of suitable aminoacids are glycine, α-alanine, β-alanine, phenylglycine, phenylalanine and 2-aminocyclohexanecarboxylic acid.

In preferred dyes, A, B, C and D, independently of one another, each are the radical of a 1-hydroxy-2-aminobenzene which is unsubstituted or substituted by halogen, nitro, sulfo or low molecular weight alkyl or alkoxy, or the radical of a 1-amino-2-hydroxy-4-sulfonaphthalene which is unsubstituted or substituted in the 6-position by halogen, such as bromine or, in particular, chlorine, nitro or sulfo.

The radicals E and F preferably derive from the following coupling component groups: phenols which couple in o-position and are unsubstituted or substituted by low molecular weight alkyl or alkoxy, dialkylamino or acylamino, where acylamino is defined as $C_1$–$C_4$-alkanoylamino, $C_1$–$C_4$-alkylsulfonylamino, $C_1$–$C_4$-alkoxycarbonylamino, aroylamino or arylsulfonylamino radicals; naphthols which are unsubstituted or substituted by $C_1$–$C_4$-alkyl or alkoxy, chlorine, amino, acylamino or sulfo, where acylamino is as defined above; 5-pyrazolones or 5-aminopyrazoles which have in the 1-position a phenyl or naphthyl radical which is unsubstituted or substituted by chlorine, nitro, $C_1$–$C_4$-alkyl or alkoxy groups or sulfo groups and in the 3-position a $C_1$–$C_4$-alkyl or carboxyl group, in particular a methyl group; naphthyl-amines which are unsubstituted or substituted by sulfo, sulfonamido or sulfonyl groups; acetoacetamides, especially acetoacetanilides, and benzoylacetanilides which can be substituted in the anilide nucleus by chlorine, bromine, nitro, $C_1$–$C_4$-alkyl or alkoxy or sulfo groups; 6-hydroxy-3-cyano- or 6-hydroxy-3-carboxamido-4-alkyl-2-pyridones which are substituted in the 1-position by substituted or unsubstituted $C_1$–$C_4$-alkyl, for example methyl, isopropyl, β-hydroxyethyl, β-aminoethyl or γ-isopropoxypropyl, or by phenyl, and can carry in the 4-position a $C_1$–$C_4$-alkyl group, in particular methyl; or hydroxyquinolines.

Examples of such coupling components are 2-naphthol, 1-naphthol, 1-acetylamino-7-naphthol, 1-propionylamino-7-naphthol, 1-carbomethoxyamino-7-naphthol, 1-carboethoxyamino-7-naphthol, 1-carbopropoxyamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 5,8-dichloro-1-naphthol, 5-chloro-1-naphthol, 2-naphthylamine, 2-naphthylamine-1-sulfonic acid, 1-naphthylamine-4- or -5-sulfonic acid, 2-aminonaphthalene-6-sulfonic acid, 2-aminonaphthalene-5-sulfonic acid, 6-methylsulfonyl-2-aminonaphthalene, 1-phenyl-3-methylpyrazol-5-one, 1-phenyl-5-pyrazolone-3-carboxamide, 1-(2'-, 3'- or 4'-methylphenyl)-3-methylpyrazol-5-one, 1-(2', 3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'- or 3',4'-dichlorophenyl)-3-methylpyrazol-5-one, 1-(2',5'-dichloro-4'-sulfophenyl)-3-methylpyrazol-5-one,
1-(2',3'- or 4'-sulfophenyl)-3-methyl-5-aminopyrazole, 1-phenyl-3-methyl-5-aminopyrazole, 1-(2'-chloro-5'-sulfophenyl)-3-methyl-5-aminopyrazole, acetoacetanilide, acetoacetanilide-4-sulfonic acid, acetoacet-o-anisidide, acetoacet-o-toluidide, acetoacet-o-chloroanilide, acetoacet-m-xylidide, tetralol, 4-methylphenol, 3-dialkylaminophenols, in particular 3-dimethylaminophenol and 3-diethylaminophenol, 4-butylphenol, preferably 4-tert.-butylphenol, 4-amylphenol, in particular 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, 1-methyl-3-cyano-4-ethyl-6-hydroxypyridone, 1-methyl-3-cyano-4-methyl-6-hydroxypyridine, 1-phenyl-3-carboxamido-4-methyl-6-hydroxypyridone and 1-ethyl-4-hydroxy-2-quinolone.

The coupling components E and F, independently of each other, each are preferably unsubstituted or amino- and/or sulfo-substituted 1- or 2-naphthol, 1- or 2-naphthylamine which can be substituted by sulfo, p-alkyl($C_1$–$C_6$)-phenol, 1-phenyl-3-methyl-5-pyrazolone or acetoacetanilide, where the phenyl group in the two last compounds can be substituted by $C_1$–$C_4$-alkyl, $C_1$–$C_4$-alkoxy, chlorine or sulfo.

If Z and/or Z' is the —CH group, E and/or F is the radical of an o-hydroxyaldehyde, preferably of an o-hydroxybenzaldehyde or o-hydroxynaphthaldehyde which can be substituted by low molecular weight alkyl, halogen, sulfo, phenylazo, sulfophenylazo, naphthylazo, sulfonaphthylazo or sulfophenylazophenyleneazo. Examples of suitable aldehydes are 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde, 5-(phenylazo)-2-hydroxybenzaldehyde, 5-(2'-, 3'- or 4'-sulfophenylazo)-2-hydroxybenzaldehyde, 5-(6'-sulfonaphthyl-1'-azo)-2-hydroxybenzaldehyde and 5-(4''-sulfo-4'-phenylazo)-phenylazo-2-hydroxybenzaldehyde.

Y is $C_1$–$C_4$-alkyl, for example methyl, ethyl, propyl, n-butyl or tert.-butyl, but preferably hydrogen.

$Ka^\oplus$ is preferably lithium, potassium or especially sodium. $Ka^\oplus$ can also be an ammonium cation or the ammonium salt of an organic amine.

n, $n_1$, $n_2$ and $n_3$ each are preferably 0, i.e. the diazo components A, B, C and D each carry a hydroxyl group in o-position relative to the azo group.

Z and Z' each are preferably nitrogen.

p is preferably 2, 3 or 4, and the sulfo groups are preferably situated in the radicals A, B, C, D, E and F.

Preferred dyes of the invention have the formula II

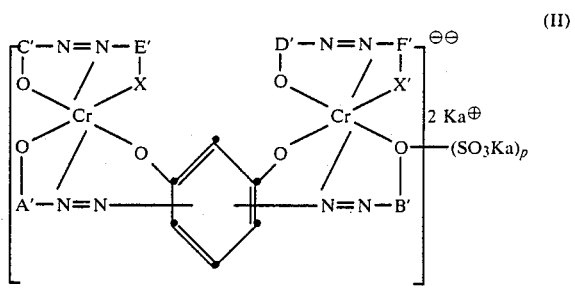

in which X and X', independently of each other, are oxygen or a group of the formula —NR—, in which R is hydrogen or $C_1$–$C_4$-alkyl, A', B', C' and D', independently of one another, each are the radical of a diazo component of the benzene or naphthalene series which carries the hydroxyl group in o-position relative to the azo group, E' and F', independently of each other, each are the radical of a coupling component which carries the group X or X' in o- or α-position relative to the azo group, p is an integer from 2 to 4, and $Ka^\oplus$ is a cation.

The most preferred dyes are those in which A', B', C' and D', independently of one another, each are the radical of a 1-hydroxy-2-aminobenzene which is unsubstituted or substituted by halogen, nitro, sulfo or low molecular weight alkyl or alkoxy, or the radical of a 1-amino-2-hydroxy-4-sulfonaphthalene which can be substituted in the 6-position by halogen, such as bromine or, in particular, chlorine, nitro or sulfo and in which E' and F', independently of each other, each are unsubstituted or amino- and/or sulfo-substituted 1- or 2-naphthol, 1- or 2-naphthylamine which can be substituted by sulfo, p-alkyl($C_1$–$C_6$)phenol, 1-phenyl-3-methyl-5-pyrazolone or acetoacetanilide, where the phenyl group in the two last compounds can be substituted by $C_1$–$C_4$-alkyl, $C_1$–$C_4$-alkoxy, chlorine or sulfo.

Dyes of the invention can be prepared by methods known per se, for example by converting a mol of a dye of the formula III

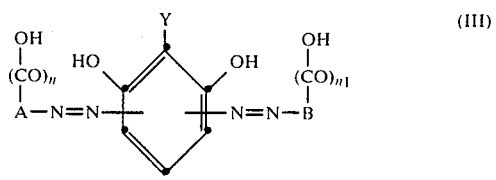

into the twofold 1:1 chromium complex, and then reacting this chromium complex with 2 mols of a dye of the formula IV

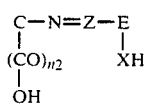

and/or a dye of the formula V

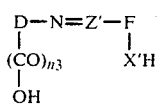

or preferably by first converting a dye of the formula IV and/or V into the 1:1 chromium complex and then converting 2 mols of this chromium complex with a mol of unchromated dye of the formula III into the twofold 1:2 chromium complex.

A, B, C, D, E, F, Z, Z', X, X', Y, n, $n_1$, $n_2$ and $n_3$ are as defined under the formula I.

The chroming to obtain the 1:1 chromium complex and the conversion of this chromium complex by means of unchromated dye into the 1:2 chromium complex are carried out by conventional methods.

If, in the above process, the dyes IV and V differ from each other, the products will be mixtures of 1:2 metal complexes which, in addition to complexes containing 2 molecules of dye of the formula IV or V, also contain complexes containing one molecule each of dye of the formula IV and dye of the formula V.

The novel metal complex dyes which can be obtained by the above processes are advantageously isolated in the form of their salts, in particular alkali metal salts, such as lithium, potassium or especially sodium salts, or ammonium salts. They are suitable for dyeing a great variety of natural or synthetic nitrogen- and hydroxyl-containing materials, such as polyamides or polyurethanes, but in particular for dyeing wool or especially leather.

Metal complex dyes of the formula I which only have 1 or 2 sulfo groups can also be isolated as amine salts, if desired. The latter are suitable, for example, for spraying leather and for colouring organic liquids, coatings and polymers.

The novel dyes are strong and have good covering properties. They have good affinity and good acid and alkali stability, and produce dyeings having good fastness properties, such as fastness to washing, water, perspiration, rubbing, diffusion, light, acid and alkali. The good build-up on various types of leather, not only leather tanned with chromium salts but also leather retanned with vegetable or synthetic tanning agents, is particularly noteworthy. Deep brown, grey and black shades are obtained.

In the following examples, parts and percentages are by weight, unless otherwise stated. The temperatures are given in degree centigrade.

In the examples, the azo bonds to the resorcinol are drawn as fixed in those cases were present knowledge allows the main product's bonding position to be stated with some certainty. Nevertheless, the formulae given are also intended to include the corresponding positional isomers, which are produced to a greater or lesser extent.

EXAMPLE 1

11.0 parts of 1,3-dihydroxybenzene are suspended in 300 parts of ice-water and are completely dissolved by adding 300 parts of a 30% sodium hydroxide solution. While the temperature is maintained at 0°–5°, 70 parts of a 1-diazo-2-hydroxy-6-nitronaphthalene-4-sulfonic acid paste, corresponding to about 0.22 mol, are added a little at a time. Afterwards the deep bluish black coupling mixture is stirred for some hours until excess diazo compound can no longer be detected. The mixture is neutralised with 5N hydrochloric acid, and the completely precipitated disazo dye of the structure

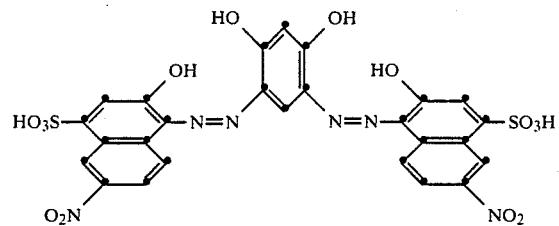

is isolated by filtration, washed with dilute sodium chloride solution and dried at 80° in vacuo. In thin layer chromatography the dye appears as a single spot and is free, in particular, of any corresponding monoazo dye.

The disazo dye obtained above is suspended in 500 parts of water at 70° in an amount which corresponds to 35.0 parts of pure dye (=0.05 mol). After addition of 48.7 parts of the 1:1 chromium complex of the monoazo dye prepared from 1-diazo-2-hydroxy-6-nitronaphthalene-4-sulfonic acid and 2-hydroxynaphthalene (0.1 mol), the suspension is adjusted to a constant pH of 7.0–7.5 by the dropwise addition of 2N sodium hydroxide solution, is heated to 90°–95° and is stirred at this temperature until the two starting dyes have been completely converted into the double mixed complex of the formula

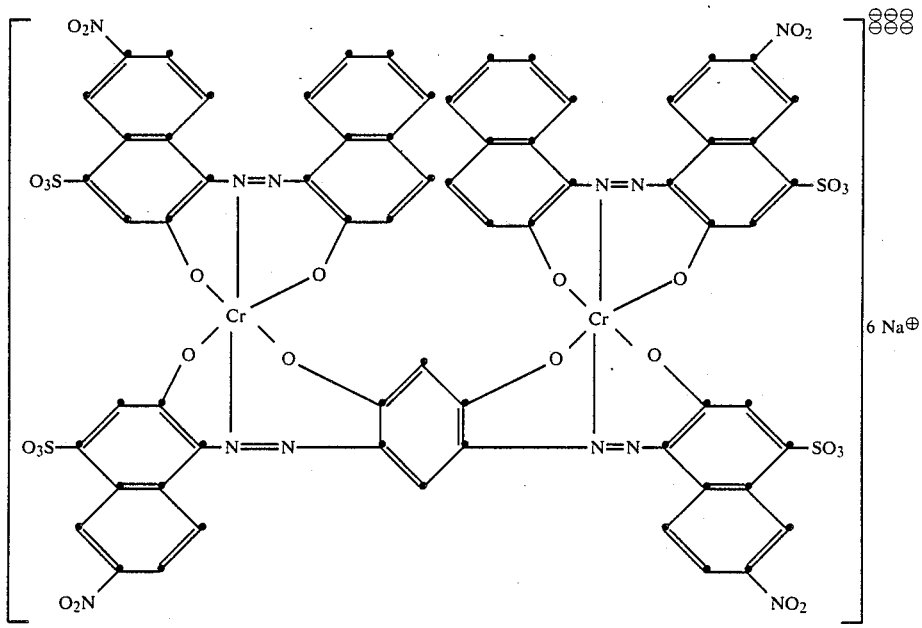

The novel dye is precipitated out of the clear, pure black reaction solution by adding sodium chloride, is isolated by filtration, is washed with dilute sodium chloride solution, is dried at 80° in vacuo and is, finally, ground. It is in the form of a readily water-soluble, black powder, and dyes chromed leather and retanned leather by the method given in the dyeing example in well-covering, fast, slightly bluish black shades.

EXAMPLE 2

Example 1 is repeated, except that 55 parts of 1-diazo-2-hydroxynaphthalene-4-sulfonic acid are used in place of 70 parts of 1-diazo-2-hydroxy-6-nitronaphthalene-4-sulfonic acid, affording a dye which dyes leather bluish black.

EXAMPLE 3

11.0 parts of 1,3-dihydroxybenzene are suspended in 100 parts of ice-water and are dissolved by adding 12 parts of sodium hydroxide. After addition of a suspension of the diazo compound obtained in a customary manner from 28.7 parts of 4-chloro-2-amino-1-hydroxy-benzene, the reaction mixture is stirred for some hours first at 3°-8° and then at a temperature rising up to 20°, until excess diazo compound is no longer detectable. A change in colour from orange-tinged red to brownish violet indicates formation of the disazo dye of the following structure:

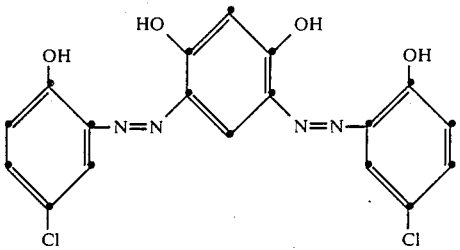

The coupling mixture is neutralised with hydrochloric acid, and the dye which has completely precipitated in the form of a brown precipitate is isolated by filtration, is washed with dilute sodium chloride solution and is dried at 80° in vacuo.

20.8 parts of the pure disazo dye, which corresponds to 0.05 mol, are suspended at 70°-75° in 400 parts of water. After addition of 43.8 parts of the 1:1 chromium complex of the monoazo dye prepared from diazotised 1-hydroxy-2-amino-4-nitrobenzene-6-sulfonic acid and 2-hydroxynaphthalene, the suspension is brought to pH 7-8 by the dropwise addition of 2N sodium hydroxide solution and is then stirred at this pH and at 90°-95° until neither of the two starting dyes is any longer detectable. The result is a clear, deep brown solution of the double, uniformly asymmetrical chromium complex of the structure:

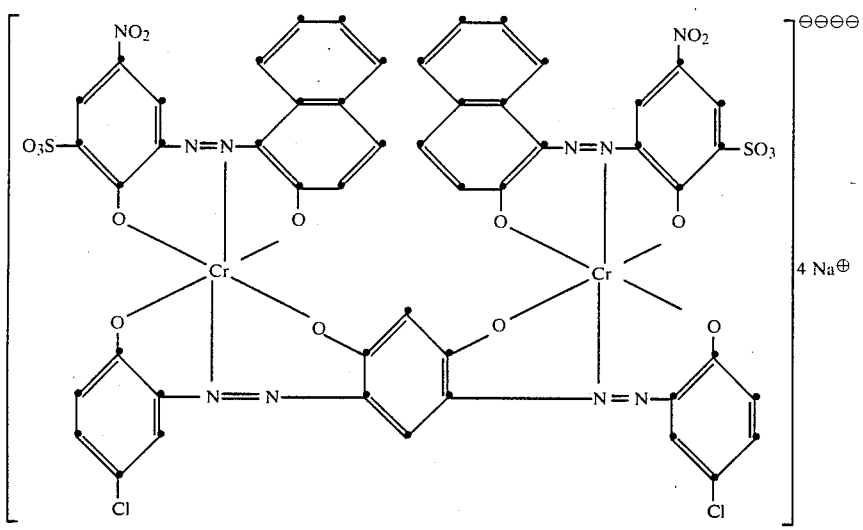

After precipitation through the addition of sodium chloride, isolation by filtering, drying and grinding, the dye is in the form of a dark brown water-soluble powder by means of which chromed leather can be dyed in fast violet-tinged dark brown shades.

The following table lists further dyes of this structural type which are obtained by the above procedure.

Column I gives the diazo component, which is reacted with resorcinol, and used in preparing the metal-free disazo dye, column II gives the 1:1 chromium complex used in the double conversin to the mixed complex, and column III gives the shade which can be obtained on leather.

| No. | I<br>Diazo<br>component | II<br>Monoazo dye used as 1:1<br>chromium complex | III<br>Shade |
|---|---|---|---|
| 1 | ![structure] | ![structure] | brownish black |
| 2 | ![structure] | ![structure] | dark brown |
| 3 | ![structure] | ![structure] | dark brown |

-continued

| No. | I Diazo component | II Monoazo dye used as 1:1 chromium complex | III Shade |
|---|---|---|---|
| 4 | (structure) | (structure) | black |
| 5 | (structure) | (structure) | olive-tinged grey |
| 6 | (structure) | (structure) | bluish black |
| 7 | (structure) | (structure) | olive-tinged brown |
| 8 | (structure) | (structure) | brown |
| 9 | (structure) | (structure) | brown |

-continued

| No. | I Diazo component | II Monoazo dye used as 1:1 chromium complex | III Shade |
|---|---|---|---|
| 10 | 3-amino-2-hydroxy-naphthalene-sulfonic acid (HO₃S, OH, NH₂ on naphthalene) | 2-hydroxy-5-sulfo-4-nitrophenyl–N=N–2-hydroxynaphthyl | violet tinged black |
| 11 | 3-amino-2-hydroxy-naphthalene-sulfonic acid | 2-hydroxy-3-nitro-5-sulfophenyl–N=N–2-hydroxynaphthyl | reddish black |
| 12 | 3-amino-2-hydroxy-naphthalene-sulfonic acid | 2-hydroxy-3-sulfo-6-chloronaphthyl–N=N–2-hydroxynaphthyl | bluish black |
| 13 | 2-amino-4-chlorophenol | 2-hydroxy-5-sulfo-4-nitrophenyl–N=N–2-hydroxy-3,5-dimethylphenyl | violet-tinged brown |
| 14 | 2-amino-4-chlorophenol | pyrazolone-based chromium complex (2-hydroxy-5-sulfo-4-nitrophenylazo-3-methyl-1-phenyl-pyrazol-5-ol) | violet tinged brown |
| 15 | 2-amino-4-chlorophenol | 2-hydroxy-3-sulfo-6-nitronaphthyl–N=N–2-hydroxynaphthyl | violet-tinged black |

-continued
| No. | I Diazo component | II Monoazo dye used as 1:1 chromium complex | III Shade |
|---|---|---|---|
| 16 | 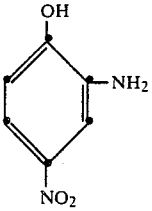 | 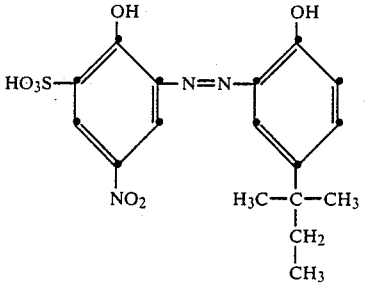 | brown |
| 17 | 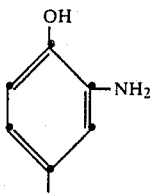 | 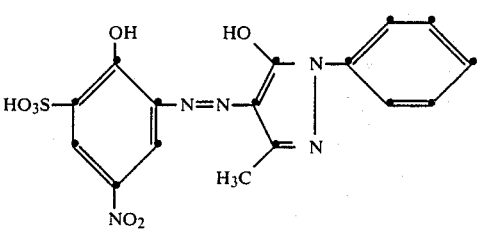 | reddish brown |
| 18 | 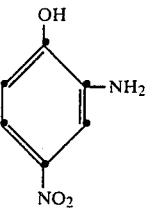 | 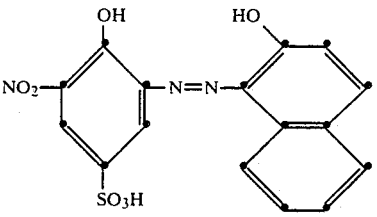 | dark brown |
| 19 | 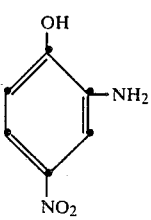 | 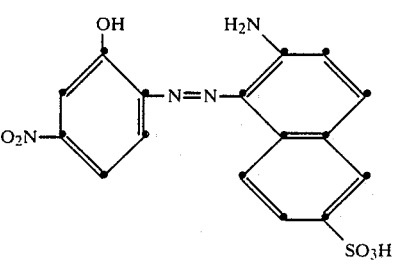 | olive-tinged brown |
| 20 | 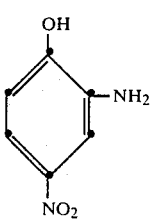 | 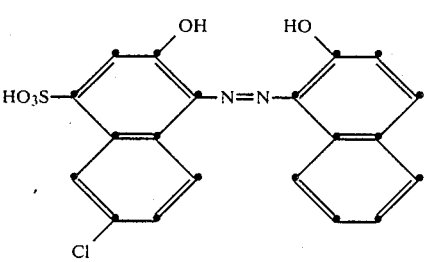 | brownish violet |

| No. | I Diazo component | II Monoazo dye used as 1:1 chromium complex | III Shade |
|---|---|---|---|
| 21 | COOH, NH₂ (benzene) | HO₃S, OH, N=N, NO₂ / HO, H₃C, N, N (pyrazolone-phenyl) | reddish brown |
| 22 | COOH, NH₂ (benzene) | HO₃S, OH, NO₂ — N=N — OH, CH₃ | brown |

EXAMPLE 4

40.5 parts of the monoazo dye which can be prepared in a known manner from 1-diazo-2-hydroxy-6-nitronaphthalene-4-sulfonic acid and 1,3-dihydroxybenzene are suspended in 400 parts of ice-water, and the suspension is admixed with, first, 100 parts of a 10N sodium hydroxide solution and then, a little at a time, with the diazo compound obtained in a conventional manner from 23.4 parts of 4-nitro-2-aminophenol-6-sulfonic acid. A change in colour from wine-red to dark green indicates the formulation, in the course of several hours, of the single asymmetrical disazo dye of the structure:

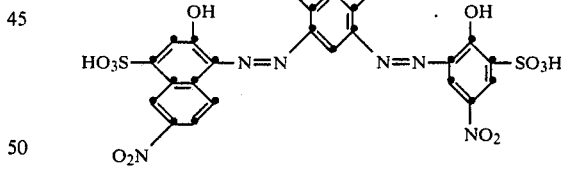

The completely dissolved disazo dye is precipitated by adding sodium chloride and neutralising the coupling solution with 5N hydrochloric acid, is isolated by filtration and is washed with 15% sodium chloride solution. An amount of the filter residue to correspond to 32.5 parts of pure disazo dye (=0.05 mol) is converted in the manner of Example 1 into a double mixed complex of the following structure:

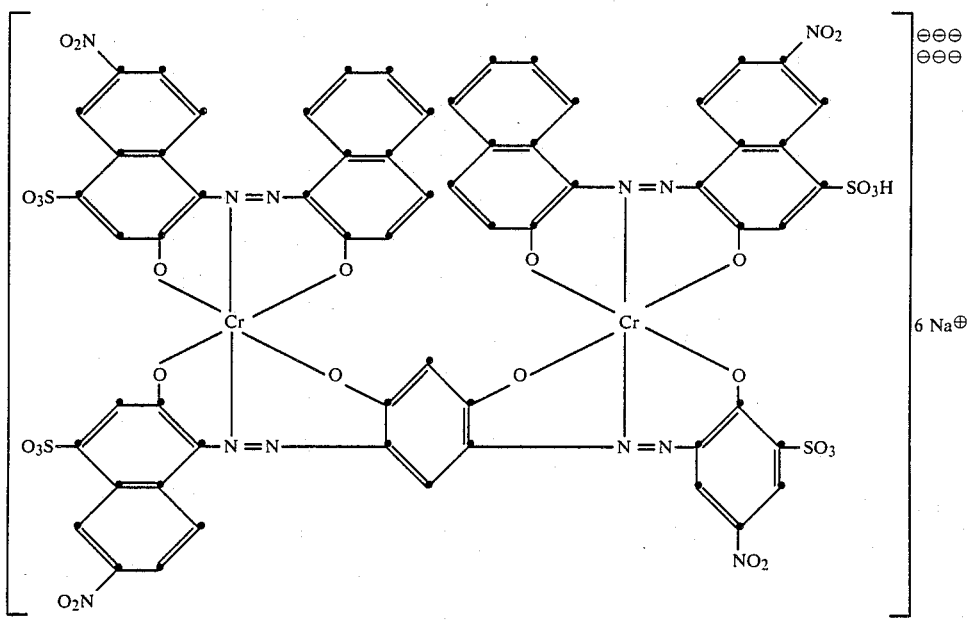

On leather this dye gives neutral black shades of good fastness properties.

EXAMPLE 5

Example 4 is repeated, except that equivalent amounts of the monoazo dye prepared from 1-diazo-2-hydroxynaphthalene-4-sulfonic acid and 1,3-dihydroxybenzene are used in place of the monoazo dye prepared from 1-diazo-2-hydroxy-6-nitronaphthalene-4-sulfonic acid and 1,3-dihydroxybenzene, affording an analogous dye which dyes leather in a somewhat bluer black than the dye of Example 4.

EXAMPLE 6

40.5 parts of the monoazo dye prepared in a conventional manner from 1-diazo-2-hydroxy-6-nitronaphthalene-4-sulfonic acid and 1,3-dihydroxybenzene are suspended in 400 parts of ice-water, and the suspension is admixed first with 100 parts of a 10N sodium hydroxide solution and then, a little at a time, with the diazo compound obtained in a conventional manner from 15.4 parts of 4-nitro-2-aminophenol. Afterwards the coupling mixture is stirred for some hours until excess diazo compound is no longer detectable. The resulting disazo dye of the structure

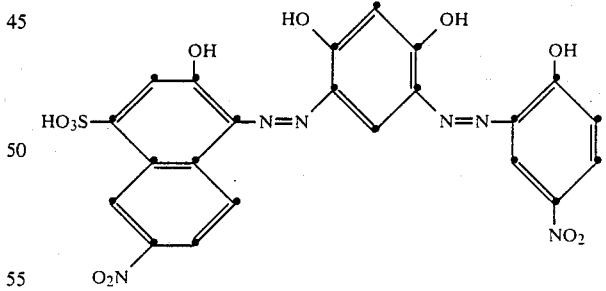

is completely precipitated by neutralising the coupling solution with 5N hydrochloric acid and adding sodium chloride, is isolated by filtration and is washed with dilute sodium chloride solution.

An amount of the filter residue to correspond to 27.6 (0.05 mol) parts of pure disazo dye is converted in the manner of Example 1 by means of 43.8 parts of the monoazo dye which has been obtained in a conventional manner from diazotised 1-hydroxy-2-amino-4-nitrobenzene-6-sulfonic acid and 2-hydroxynaphthalene and is in the form of the 1:1 chromium complex, into the chromium complex of the following structure:

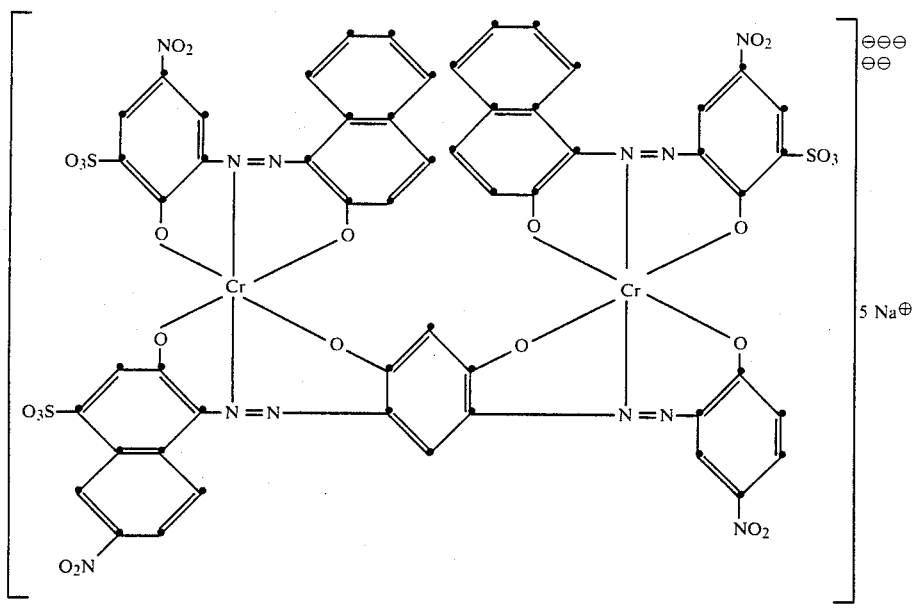

Chromed leather can be dyed with this dye in well-covering, fast black shades.

EXAMPLE 7

14.35 parts of 4-chloro-2-aminophenol are diazotised in a conventional manner and are coupled, in the presence of excess sodium carbonate, with 11.1 parts of 1,3-dihydroxybenzene to give the monoazo dye of the structure

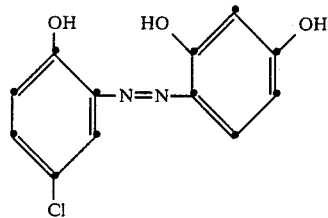

The suspension obtained is admixed a little at a time with the diazo compound obtained in a known manner from 23.4 parts of 4-nitro-2-aminophenol-6-sulfonic acid, while pH 9.5–10.5 is maintained by the simultaneous dropwise addition of 5N sodium hydroxide solution and the temperature is held at 10°–12° by cooling in ice-water. The coupling to give the brownish violet disazo dye of the structure

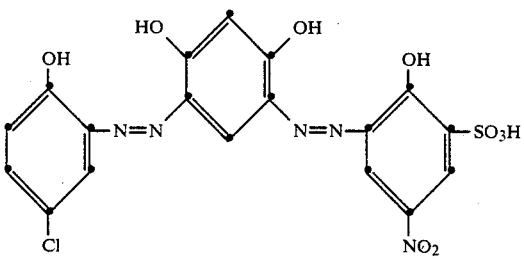

has ended after stirring for some hours. The dye is precipitated by neutralising with 2N hydrochloric acid and adding a little sodium chloride, is separated off by filtration and is washed with dilute sodium chloride solution.

An amount of the filter residue to correspond to 25 parts (=0.05 mol) of pure disazo dye is converted under the conditions described in Example 1, by means of 46.8 parts of the 1:1 chromium complex of the known monoazo dye prepared from diazotised 4-nitro-2-aminophenol-6-sulfonic acid and 1-phenyl-3-methylpyrazol-5-one, into the complex of the following structure:

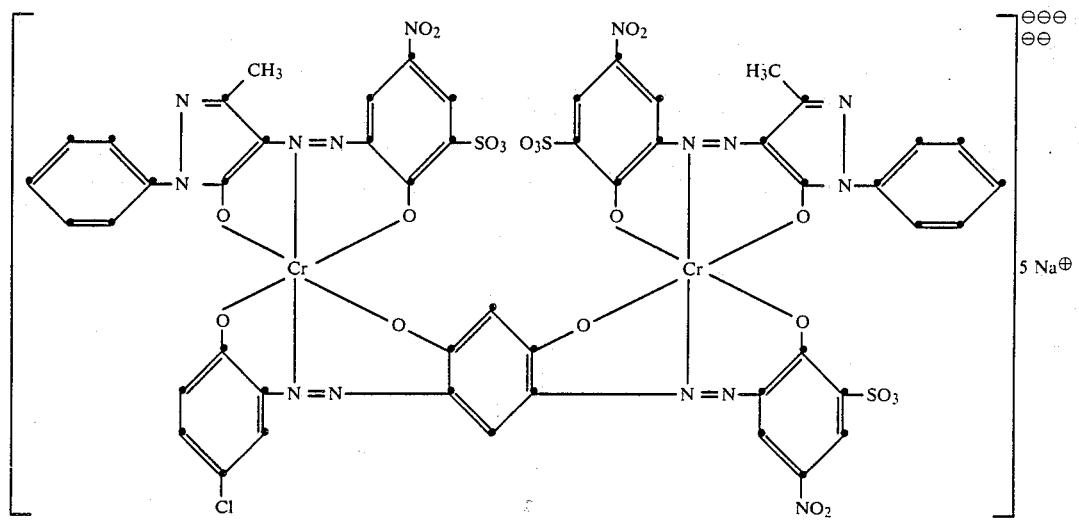

The dye dyes leather in full reddish brown shades which have good wet and light fastness properties.

EXAMPLE 8

13.7 parts of 1-aminobenzene-2-carboxylic acid are diazotised in a customary manner and are coupled, in the presence of excess sodium carbonate, with 11.1 parts of 1,3-dihydroxybenzene. The resulting suspension of the orange-yellow monoazo dye is admixed at 10°–20° a little at a time with the diazo compound obtained from 15.4 parts of 4-nitro-2-amino-1-hydroxybenzene, while pH 9-10 is maintained by the simultaneous dropwise addition of 5N sodium hydroxide solution. The coupling to give the disazo dye of the structure

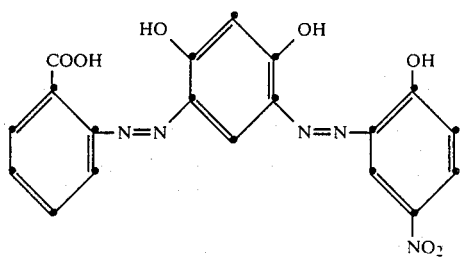

ends some hours later. The brown dye, completely precipitated on neutralising with 2N hydrochloric acid, is isolated by filtration and washed with dilute sodium chloride solution.

An amount of the filter residue to correspond to 21.15 parts (=0.05 mol) of pure disazo dye is converted under the reaction conditions used in Example 1, by means of 41.6 parts of the 1:1 chromium complex of the monoazo dye prepared in a known manner from diazotised 4-nitro-2-amino-1-hydroxybenzene-6-sulfonic acid and 3,4-dimethyl-1-hydroxybenzene, into the complex of the following structure:

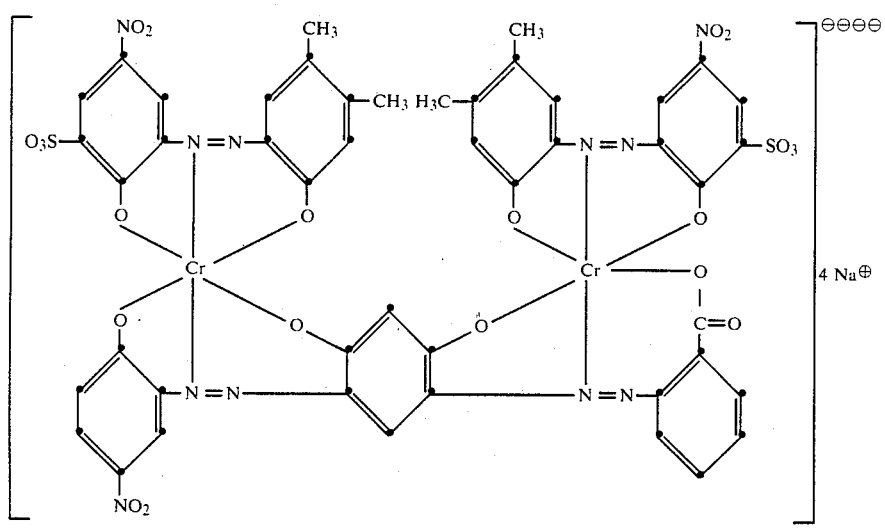

This dye dyes chromed leather and retanned leather in well-covering brown shades which are fast to light.

EXAMPLE 9

31.5 parts of the monoazo dye obtained by alkaline coupling from diazotised 4-nitro-2-amino-1-hydroxybenzene and 4-t-amylphenol are suspended in 300 parts of ethylene glycol monomethyl ether. After addition of 26.6 parts of chromium(III) chloride hexahydrate, the reaction mixture is heated with stirring to 105° and is held at this temperature until all the monoazo dye has been converted into the corresponding 1:1 chromium complex.

The resulting clear, brownish red solution is cooled down to 90°-95° and is admixed with a suspension of 25 parts of the metal-free disazo dye described in Example 7 in 300 parts of water at 70° and with sufficient 1N sodium hydroxide solution for the resulting reaction mixture to be at pH 7.5-8.0. Stirring for two hours at 90°-95° completes the conversion to the double, uniformly asymmetrical complex of the structure

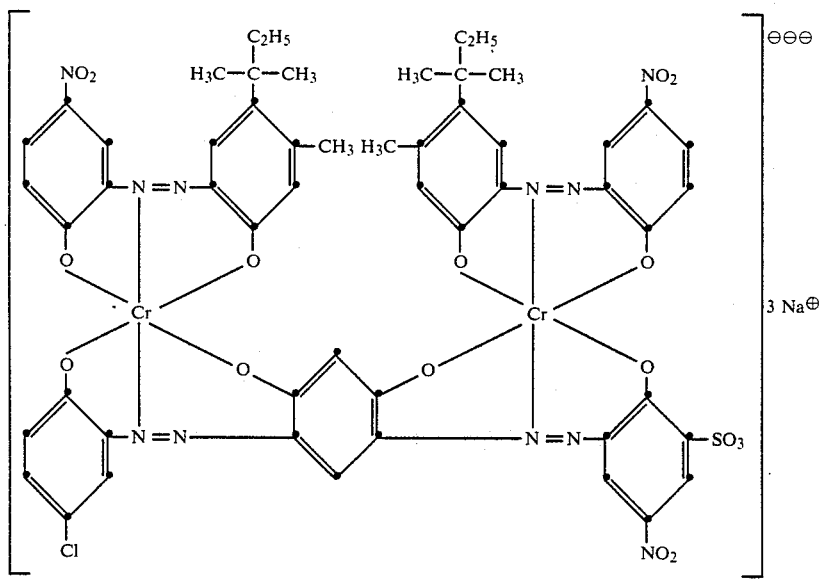

The dye obtained on evaporating the reaction solution dyes wool, polyamide fibres and leather in reddish brown shades which are fast to light.

The following table lists further dyes which are obtained by the above procedure. Columns I and II give the diazo components used in preparing the disazo dyes which can be metallised twice, column III gives the 1:1 chromium complexes used in the conversion to the double uniformly asymmetrical complex, and column IV gives the shades which can be obtained on wool, polyamide and leather.

| No. | I 1st diazo component | II 2nd diazo component | III Monoazo dye used as 1:1 chromium complex | IV Shade on Leather |
|---|---|---|---|---|
| 1 | HO3S-[naphthalene-OH,NH2,NO2] | HO3S-[benzene-OH,NH2,Cl] | HO3S-[naphthalene-OH,NO2]-N=N-[naphthalene-OH] | bluish black |
| 2 | HO3S-[naphthalene-OH,NH2,NO2] | [benzene-OH,NH2,Cl] | HO3S-[naphthalene-OH,NO2]-N=N-[naphthalene-HO] | black |
| 3 | HO3S-[naphthalene-OH,NH2,NO2] | O2N-[benzene-OH,NH2,NO2] | HO3S-[naphthalene-OH,NO2]-N=N-[naphthalene-OH] | black |
| 4 | HO3S-[naphthalene-OH,NH2,NO2] | Cl-[benzene-OH,NH2,SO3H] | HO3S-[benzene-OH,NO2]-N=N-[naphthalene-HO] | bluish black |
| 5 | HO3S-[naphthalene-OH,NH2,NO2] | O2N-[benzene-OH,NH2,SO3H] | HO3S-[benzene-OH,NO2]-N=N-[naphthalene-HO] | black |
| 6 | HO3S-[naphthalene-OH,NH2] | O2N-[benzene-OH,NH2,NO2] | HO3S-[naphthalene-OH,NO2]-N=N-[naphthalene-HO] | reddish black |
| 7 | HO3S-[naphthalene-OH,NH2] | HO3S-[benzene-OH,NH2,Cl] | HO3S-[benzene-OH,NO2]-N=N-[naphthalene-HO] | black |
| 8 | HO3S-[naphthalene-OH,NH2,NO2] | O2N-[benzene-OH,NH2,SO3H] | HO3S-[naphthalene-OH,NO2]-N=N-[naphthalene-HO] | black |

-continued

| No. | I 1st diazo component | II 2nd diazo component | III Monoazo dye used as 1:1 chromium complex | IV Shade on Leather |
|---|---|---|---|---|
| 9 | HO₃S—[naphthalene]—OH, NH₂ | NO₂—[benzene]—OH, NH₂, SO₃H | HO₃S—[benzene(NO₂)]—OH—N=N—[naphthalene]—HO | black |
| 10 | HO₃S—[naphthalene(NO₂)]—OH, NH₂ | [benzene(Cl)]—OH, NH₂ | HO₃S—[naphthalene]—OH—N=N—[benzene]—OH | violet |
| 11 | HO₃S—[naphthalene]—OH, NH₂ | [benzene(NO₂)]—OH, NH₂ | HO₃S—[benzene(NO₂)]—OH—N=N—[pyrazole with CH₃, phenyl]—OH | dark brown |
| 12 | HO₃S—[naphthalene]—OH, NH₂ | O₂N—[benzene(NO₂)]—OH, NH₂ | HO₃S—[naphthalene]—OH—N=N—[naphthalene]—OH | greenish black |
| 13 | HO₃S—[benzene(NO₂)]—OH, NH₂ | [benzene(NO₂)]—OH, NH₂ | HO₃S—[naphthalene(O₂N)]—OH—N=N—[naphthalene]—OH | reddish black |
| 14 | O₂N—[benzene(SO₃H)]—OH, NH₂ | [benzene(Cl)]—OH, NH₂ | HO₃S—[benzene(NO₂)]—OH—N=N—[benzene(C(CH₃)₃)]—HO | brown |
| 15 | [benzene(Cl)]—OH, NH₂ | HO₃S—[benzene(NO₂)]—OH, NH₂ | HO₃S—[benzene(NO₂)]—OH—N=N—[naphthalene]—HO | violet-tinged brown |
| 16 | HO₃S—[benzene(Cl)]—OH, NH₂ | O₂N—[benzene(NO₂)]—OH, NH₂ | HO₃S—[naphthalene]—OH—N=N—[naphthalene]—OH | black |
| 17 | Cl—[benzene(SO₃H)]—OH, NH₂ | [benzene(NO₂)]—OH, NH₂ | HO₃S—[naphthalene(O₂N)]—OH—N=N—[naphthalene]—OH | black |

-continued
| No. | I 1st diazo component | II 2nd diazo component | III Monoazo dye used as 1:1 chromium complex | IV Shade on Leather |
|---|---|---|---|---|
| 18 | 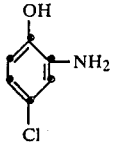 | 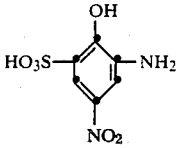 | 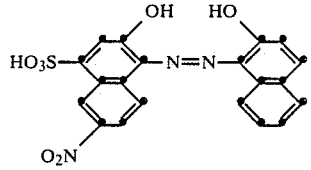 | violet-tinged black |
| 19 | 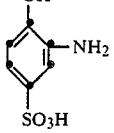 | 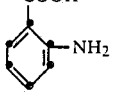 | 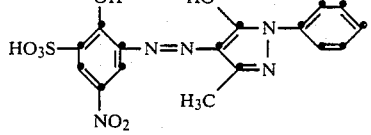 | yellowish brown |
| 20 | 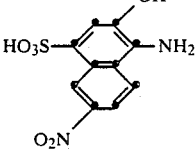 | 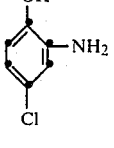 | 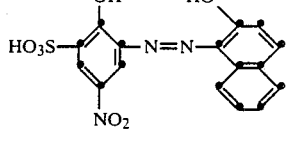 | black |
| 21 | 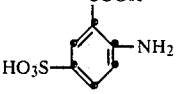 | 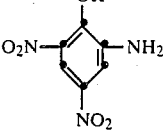 | 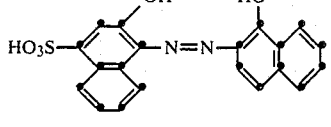 | greenish black |
| 22 | 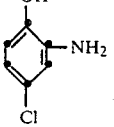 | 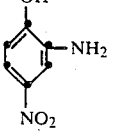 | 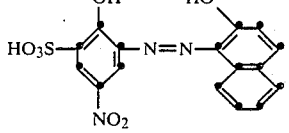 | violet |
| 23 | 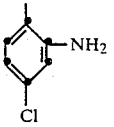 | 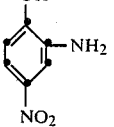 | 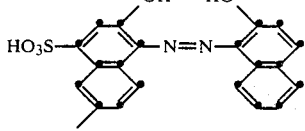 | dark violet |
| 24 | 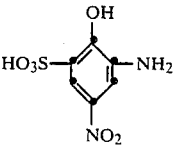 | 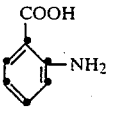 | 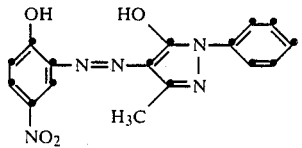 | orange-tinged brown |
| 25 | 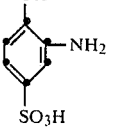 | 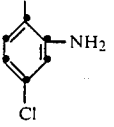 | 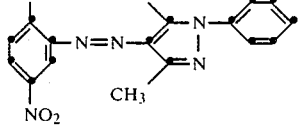 | reddish brown |
| 26 | 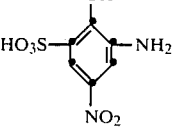 | 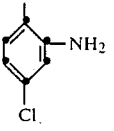 | 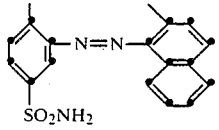 | violet-tinged brown |

| No. | I<br>1st diazo<br>component | II<br>2nd diazo<br>component | III<br>Monoazo dye used as<br>1:1 chromium complex | IV<br>Shade<br>on<br>Leather |
|---|---|---|---|---|
| 27 | 1-hydroxy-2-amino-naphthalene-sulfonic acid | 2-amino-4-nitrophenol | (chromium complex structure) | black |
| 28 | 1-hydroxy-2-amino-naphthalene-sulfonic acid | 2-amino-4-nitrophenol | (chromium complex structure with O₂N) | bluish black |
| 29 | 1-hydroxy-2-amino-naphthalene-sulfonic acid | 2-amino-4-chlorophenol | (chromium complex structure with Cl) | violet |
| 30 | 1-hydroxy-2-amino-naphthalene-sulfonic acid | 1-hydroxy-2-amino-nitronaphthalene-sulfonic acid | (chromium complex structure with NO₂) | brownish black |
| 31 | 1-hydroxy-2-amino-6-nitronaphthalene-sulfonic acid | 1-hydroxy-2-amino-naphthalene-sulfonic acid | (chromium complex structure with O₂N, H₂N) | greenish black |
| 32 | 1-hydroxy-2-amino-6-nitronaphthalene-sulfonic acid | 1-hydroxy-2-amino-naphthalene-sulfonic acid | (chromium complex structure with NO₂) | brownish black |
| 33 | 1-hydroxy-2-amino-6-nitronaphthalene-sulfonic acid | 2-amino-4-nitrophenol | (chromium complex structure with O₂N) | black |
| 34 | 1-hydroxy-2-amino-6-nitronaphthalene-sulfonic acid | 2-amino-4-sulfophenol | (chromium complex structure with O₂N) | bluish black |

EXAMPLE 10

27.6 parts of the metal-free disazo dye described in Example 6 are dispersed by stirring in 400 parts of water at 70°. After addition of 21.9 parts of a monoazo dye which has been prepared in a known manner from diazotised 1-hydroxy-2-amino-4-nitrobenzene-6-sulfonic acid and 2-hydroxynaphthalene and is in the form of the 1:1 chromium complex, and of 23.4 parts of a monoazo dye which has been conventionally prepared from diazotised 1-hydroxy-2-amino-6-nitrobenzene-4-sulfonic acid and 1-phenyl-3-methylpyrazol-5-one and is in the form of the 1:1 chromium complex, the reaction mixture is heated to 90°–95° and is stirred under reflux at pH 7.0–7.5, maintained by means of dilute sodium hydroxide solution, until the starting materials are no longer detectable. The resulting, deep brown reaction solution contains a mixture of 3 metal complex dyes of the following structures:

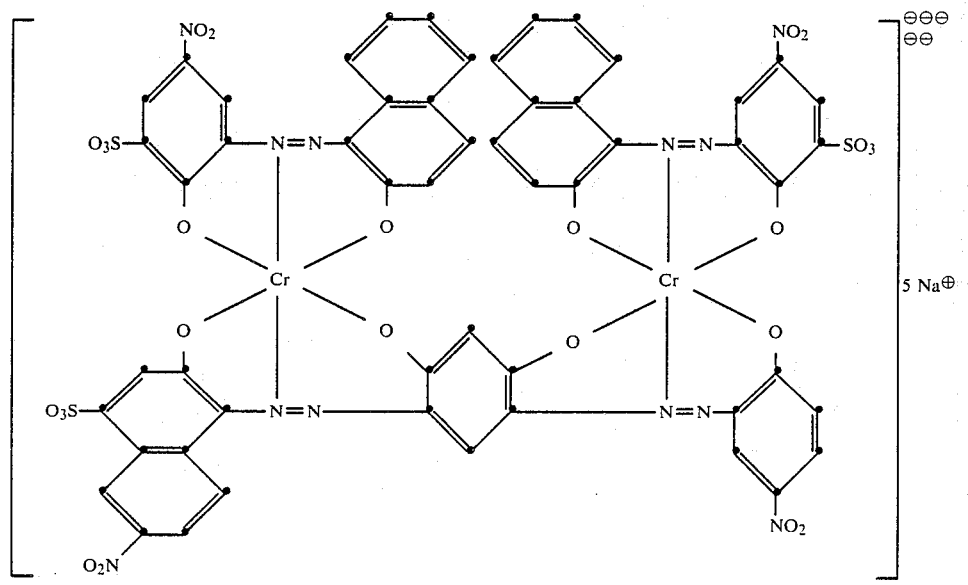

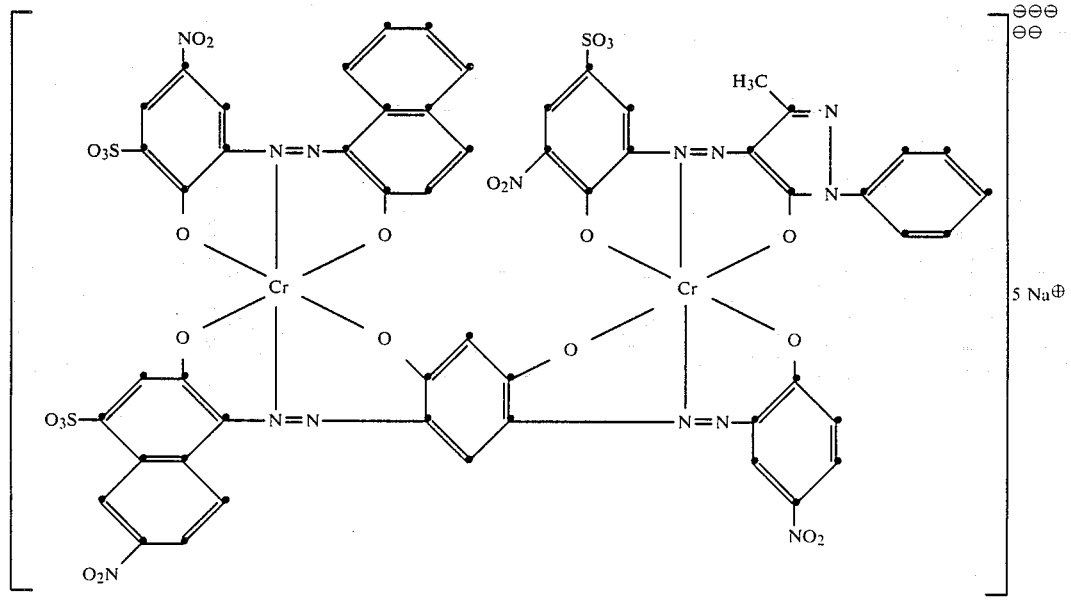

-continued

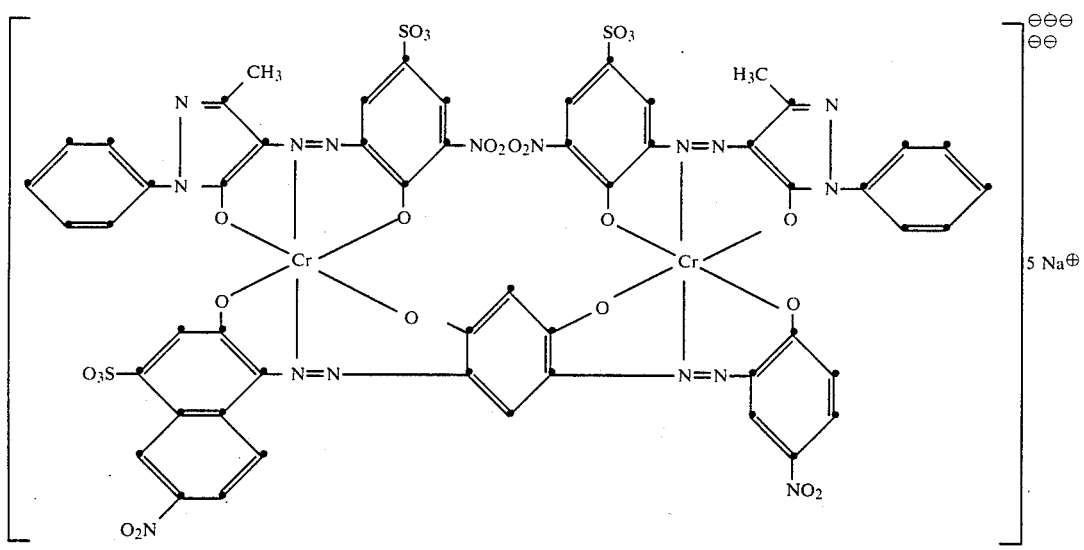

The filtered reaction solution is evaporated to dryness to isolate the novel dye, which dyes chromed leather and retanned leather in full, dark brownish shades which are fast to light.

Example 10 is repeated, except that the metal-free disazo dye described in Example 1 is used in place of the disazo dye used above, affording a dye which dyes leather in full, brownish black shades which have good light and wet fastness properties.

EXAMPLE 11

25 parts of the metal-free disazo dye obtained in Example 7 are suspended by stirring in 300 parts of water at 70°. After addition of 35.8 parts of the 1:1 chromium complex of the already known azomethine dye from 1-hydroxy-2-amino-4-nitrobenzene-6-sulfonic acid and 2-hydroxybenzaldehyde, the reaction mixture is brought to pH 7.0–7.5 by the dropwise addition of dilute sodium hydroxide solution, is then heated to 90°–95° and is then stirred under reflux until the starting materials are no longer detectable. The result is a clear, reddish brown solution of the complex dye of the following structure:

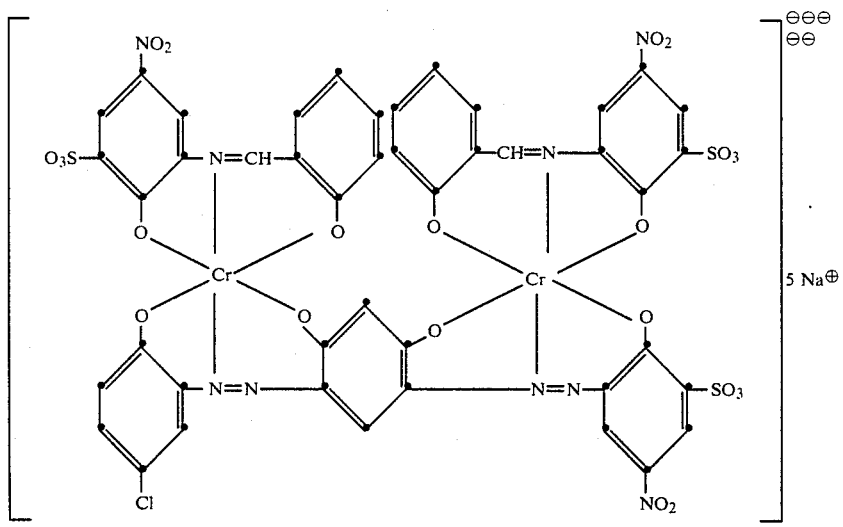

The novel dye obtained on evaporating the reaction solution to dryness dyes leather in full, yellowish brown shades which have good wet and light fastness properties.

Example 11 is repeated, except that 17.9 parts of the 1:1 chromium complex of the azomethine dye mentioned and 21.9 parts of the 1:1 chromium complex of the monoazo dye from diazotised 1-hydroxy-2-amino-4-nitrobenzene-6-sulfonic acid and 2-hydroxynaphthalene are jointly used in place of the 35.8 parts of the 1:1 chromium complex of the azomethine dye mentioned, affording a three-component mixture of asymmetrical chromium complexes.

The readily water-soluble dye isolated by evaporation to dryness dyes chromed leather and retanned leather in well-covering, fast brown shades.

EXAMPLE 12

32.5 parts of the metal-free disazo dye mentioned in Example 4 are suspended in 200 parts of ethylene glycol. After addition of 27 parts of chromium(III) chloride hexahydrate, the reaction mixture is heated to about 130°–135° and is stirred at this temperature until the starting dye is no longer detectable. A change in colour from reddish brown to greyish blue indicates the formation of a twofold 1:1 chromium complex of the following structure amide fibres and especially leather in full violet-tinged black shades.

Example 12 is repeated, except that a mixture of 15.45 parts of the monoazo dye from diazotised 4-nitro-2-aminophenol and 2-hydroxynaphthalene and 21.95 parts of the monoazo dye with from 1-diazo-2-hydroxy-6-nitronaphthalene-4-sulfonic acid and 1-hydroxynaph-

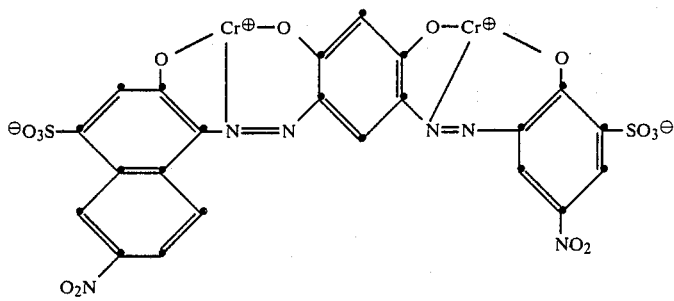

The metallisation mixture is cooled down to 60° and is diluted, with stirring, with 800 parts of a 20% sodium chloride solution, and the chromium complex dye precipitates; it is isolated by filtration and washed with dilute sodium chloride solution.

An amount of the filter residue to correspond to 37.4 parts of pure twofold 1:1 complex is suspended by stirring in 400 parts of water at 70°. After addition of 34.3 parts of the monoazo dye from diazotised 1-hydroxy-2-aminobenzene-4-sulfonamide and 2-hydroxynaphthalene, the reaction mixture is heated with stirring to 90°–95° while, at the same time, pH 7.5–8.5 is maintained by the dropwise addition of 2N sodium hydroxide solution. The result is a deep violet solution of the chromium complex of the following structure:

thalene is used in place of the monoazo dye mentioned, affording a complex dye which consists of three different complexes and with which well-covering, greenish black shades can be obtained on leather.

EXAMPLE 13

27.6 parts of the metal-free disazo dye described in Example 6 are converted into the corresponding twofold 1:1 chromium complex by the method of Example 12. 32.7 parts of the pure chromium complex are suspended in 400 parts of water at 70° together with 15.4 parts of 4-nitro-2-aminophenol and 30.5 parts of the monoazo dye obtained from diazotised 1-aminobenzene-4-sulfonic acid and 2-hydroxybenzaldehyde. The reaction mixture is heated with stirring to 90°–95°,

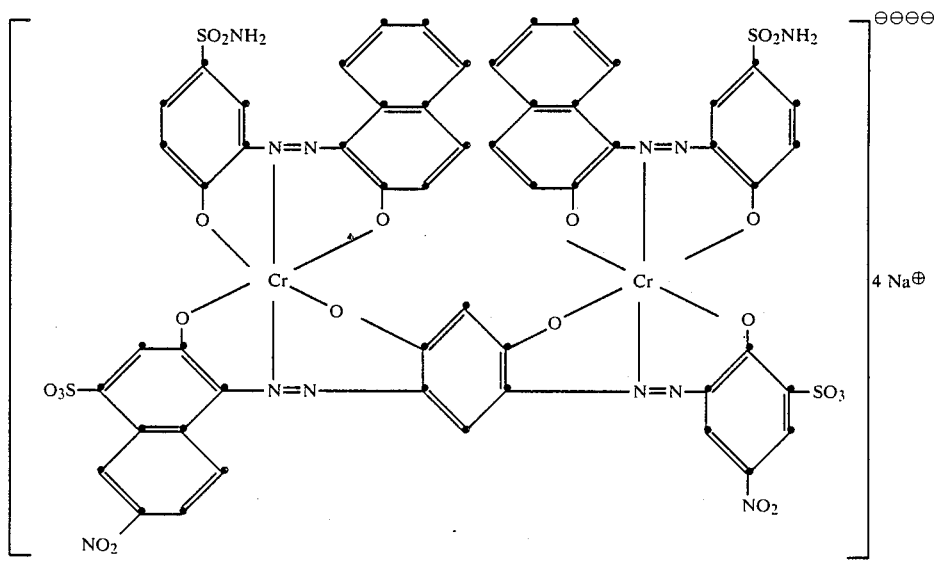

The novel dye is precipitated out of the reaction solution by adding sodium chloride, is isolated by filtration, is washed with sodium chloride solution, and is dried. It is readily water-soluble, and dyes wool, polywhile, at the same time, pH 7.0–7.5 is maintained by the dropwise addition of 2N sodium hydroxide solution. The result is a clear, olive-green solution of the following chromium complex:

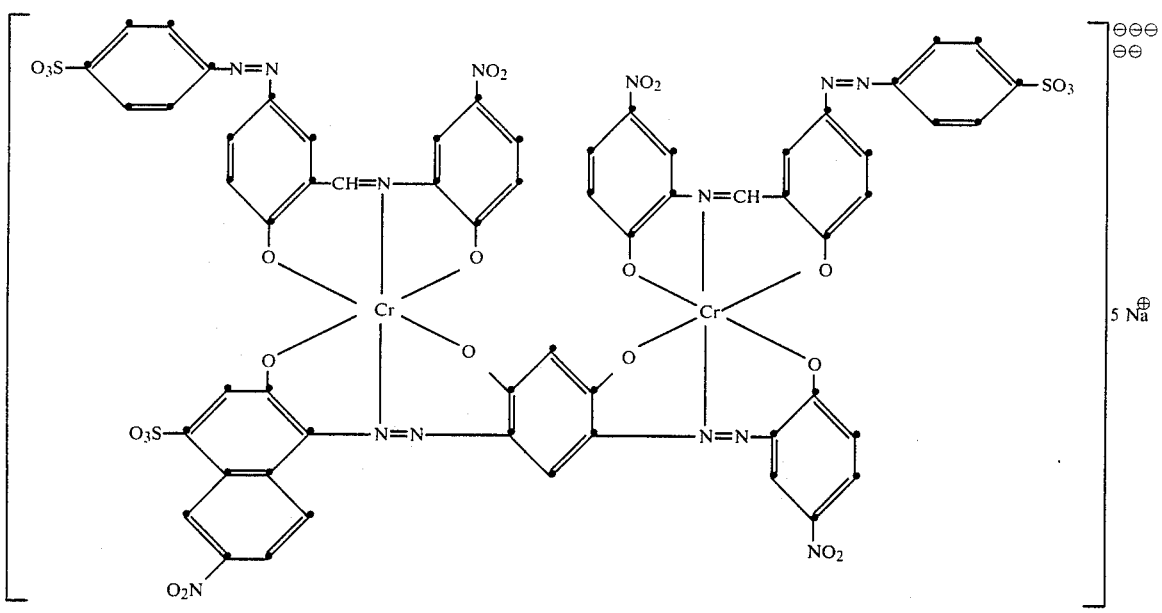

Evaporating the reaction solution to dryness gives a readily water-soluble dye which dyes leather in full olive-green shades which have good light and wet fastness properties.

EXAMPLE 14

35 parts of the metal-free disazo dye described in Example 1 are converted into the corresponding twofold 1:1 chromium complex by metallisation with chromium(III) chloride hexahydrate in ethylene glycol as in Example 12.

40.2 parts of the pure chromium compound are reacted by the method of Example 12 or 13 with a mixture of 20.95 parts of the monoazo dye obtained from diazotised 1-hydroxy-2-amino-6-nitrobenzene-4-sulfonic acid and 1-phenyl-3-methyl-pyrazol-5-one and 16.9 parts of the azomethine dye obtained from 1-hydroxy-2-amino-4-nitrobenzene-6-sulfonic acid and 2-hydroxybenzaldehyde. The deep brown reaction solution consists of a mixture of three components, i.e. two double uniformly asymmetrical complexes which each contain the same monoazo or azomethine dye, and a mixed complex formed by addition of both the monoazo and azomethine dye onto the twofold 1:1 chromium complex.

Evaporating the reaction solution to dryness gives a novel dye which dyes various types of leather in well-covering brown shades which have good wet and light fastness properties.

EXAMPLE 15

35 parts of the metal-free disazo dye obtained as in Example 1 are converted into the corresponding twofold 1:1 chromium complex by metallisation with chromium(III) chloride hexahydrate in ethylene glycol as in Example 12.

40.2 parts of the pure chromium compound are suspended in 400 parts of water at 75° C. After the addition of 12.2 parts of salicylaldehyde and 7.5 parts of aminoacetic acid, the reaction mixture is heated with stirring to 90°–95° C. and is at the same time maintained at pH 7–7.5 by the dropwise addition of 2N sodium hydroxide solution. The result is a clear dark green solution of the complex dye of the following structure:

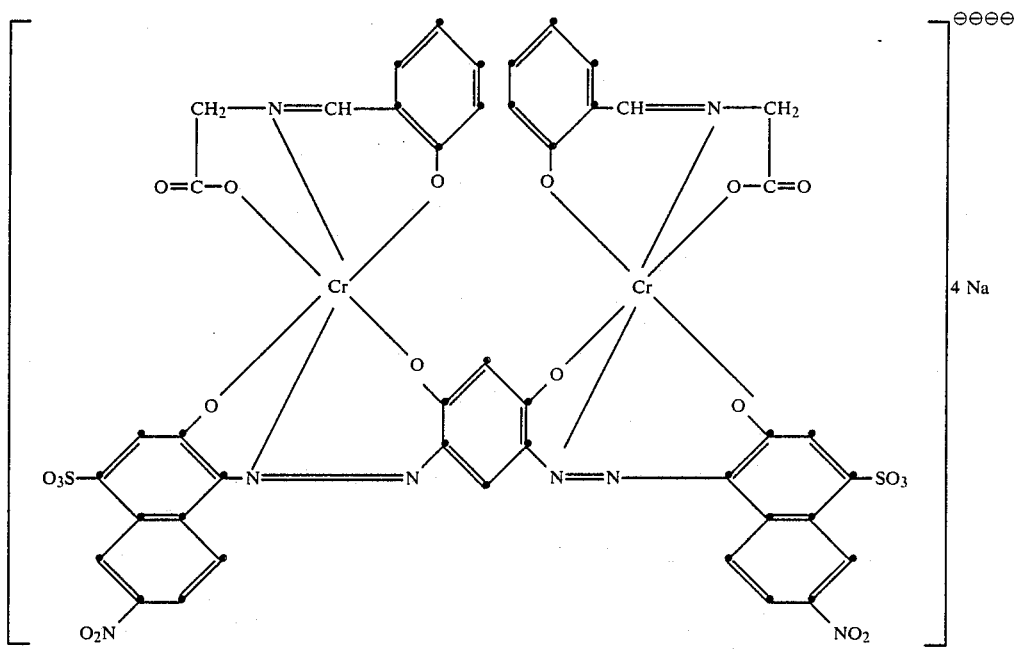

Evaporating to dryness isolates a dye which dyes leather of different grades in olive-grey to black shades which are fast to light.

A METHOD FOR DYEING LEATHER 100 parts of clothing suede leather (dry weight) are wetted out at 50° in a solution of 1,000 parts by volume of water and 2 parts of 24% ammonia in the course of 2 hours, and are then dyed at 60° in a solution of 1,000 parts by volume of water, 2 parts of 24% ammonia and 6 parts of dye of Example 1 for one hour. A solution of 40 parts by volume of water and 4 parts of 85% formic acid is then added, and dyeing is continued for a further 30 minutes. The leather pieces are then thoroughly rinsed and are treated, if desired, with 2 parts of a dicyandiamide-formaldehyde condensation product at 50° for 30 minutes.

Other suede leathers and glove leather can be dyed in the same way.

The black dyeings thus obtained are distinguished by generally good fastness properties and very good cover.

What is claimed is:

1. A chromium complex dye of the formula I

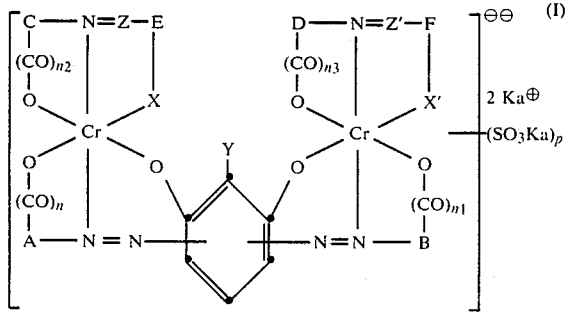

in which Z and Z', independently of each other, each are nitrogen or a —CH group, X and X', independently of each other, each are oxygen or a group of the formula —NR—, in which R is hydrogen or $C_1$–$C_4$-alkyl, but X and X' have to be oxygen when Z or Z' respectively is the —CH group, A and B, independently of each other, each are the radical of a diazo component of the benzene or naphthalene series which carries the hydroxyl or carboxyl group in o-position relative to the azo group, C and D, independently of each other, each are a radical of the benzene or naphthalene series with carries a hydroxyl or carboxyl group in o-position relative to the azo or azomethine group, or, if $n_2$ and/or $n_3 = 1$ and Z is a —CH group, the radical of an aliphatic, cycloaliphatic or aromatic aminocarboxylic acid, E and F, independently of each other, each are the radical of a coupling component when Z is nitrogen, the coupling component containing the group X or X' in o- or α-position relative to the azo group, or the radical of an o-hydroxyaldehyde when Z is the —CH group, Y is $C_1$–$C_4$-alkyl or hydrogen, n, $n_1$, $n_2$ and $n_3$, independently of one another, each are 0 or 1, p is an integer from 1 to 6, and $Ka^\oplus$ is a cation.

2. A chromium complex dye according to claim 1, in which A, B, C and D, independently of one another, each are the radical of a 1-hydroxy-2-aminobenzene which is unsubstituted or substituted by halogen, nitro, sulfo or low molecular weight alkyl or alkoxy, or the radical of a 1-amino-2-hydroxy-4-sulfonaphthalene which can be substituted in the 6-position by halogen, nitro or sulfo.

3. A chromium complex dye according to claim 1, in which Z or Z' is nitrogen and E and F, independently of each other, each are unsubstituted or amino- and/or sulfo-substituted 1- or 2-naphthol, 1- or 2-naphthylamine which can be substituted by sulfo, p-alkyl($C_1$–$C_6$)-phenol, 1-phenyl-3-methyl-5-pyrazolone or acetoacetanilide, where the phenyl group in the two last compounds can be substituted by $C_1$–$C_4$-alkyl, $C_1$–$C_4$-alkoxy, chlorine or sulfo.

4. A chromium complex dye according to claim 1, in which Z and/or Z' is a CH group while E and/or F is the radical of an o-hydroxybenzaldehyde or o-hydroxynaphthaldehyde which can be substituted by low molecular weight alkyl, halogen, sulfo, phenylazo, sulfophenylazo, naphthylazo, sulfonaphthylazo or sulfophenylazophenyleneazo.

5. A chromium complex dye according to claim 1, in which n, $n_1$, $n_2$ and $n_3$ are all 0.

6. A chromium complex dye according to claim 1, in which p is 2, 3 or 4 and the sulfo groups are situated in the radicals A, B, C, D, E and F.

7. A chromium complex dye according to claim 1, in which Y is hydrogen.

8. A chromium complex dye according to claim 1 of the formula II

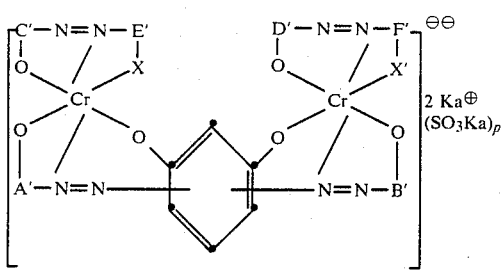

in which X and X', independently of each other, are oxygen or a group of the formula —NR—, in which R is hydrogen or $C_1$–$C_4$-alkyl, A', B', C' and D', independently of one another, each are the radical of a diazo component of the benzene or naphthalene series which carries the hydroxyl group in o-position relative to the azo group, E' and F', independently of each other, each are the radical of a coupling component which carries the group X or X' in o- or α-position relative to the azo group, p is an integer from 2 to 4, and Ka$^\oplus$ is a cation.

9. A chromium complex dye according to claim 8, in which A', B', C' and D', independently of one another, each are the radical of a 1-hydroxy-2-aminobenzene which is unsubstituted or substituted by halogen, nitro, sulfo or low molecular weight alkyl or alkoxy, or the radical of a 1-amino-2-hydroxy-4-sulfonaphthalene which can be substituted in the 6-position by halogen, nitro or sulfo.

10. A chromium complex dye according to claim 8, in which E' and F', independently of each other, each are unsubstituted or amino- and/or sulfo-substituted 1- or 2-naphthol, 1- or 2-naphthylamine which can be substituted by sulfo, p-alkyl($C_1$–$C_6$)phenol, 1-phenyl-3-methyl-5-pyrazolone or acetoacetanilide, where the phenyl group in the two last compounds can be substituted by $C_1$–$C_4$-alkyl, $C_1$–$C_4$-alkoxy, chlorine or sulfo.

11. A process for preparing a chromium complex dye of the formula I, which comprises converting a mol of a dye of the formula III

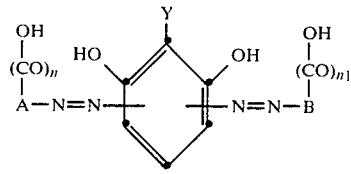

into the twofold 1:1 chromium complex, and then reacting this chromium complex with 2 mols of a dye of the formula IV

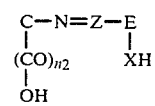

and/or a dye of the formula V

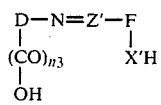

or first converting a dye of the formula IV and/or V to the 1:1 chromium complex and then converting 2 mols of this chromium complex with one mol of unchromed dye of the formula III into the twofold 1:2 chromium complex, where A, B, C, D, E, F, Z, Z', X, X', Y, n, $n_1$, $n_2$ and $n_3$ are as defined under the formula I.

12. A process for dyeing nitrogen- or hydroxyl-containing material, comprising the step of applying thereto a chromium complex dye of claim 1.

13. The process of claim 12, wherein the nitrogen- or hydroxy-containing material is a polyamide.

14. The process of claim 13 wherein the polyamide is wool.

15. The process of claim 13 wherein the polyamide is leather.

* * * * *

UNITED STATES PATENT AND TRADEMARK OFFICE
CERTIFICATE OF CORRECTION

PATENT NO. : 4,502,860
DATED : March 5, 1985
INVENTOR(S) : Gerhard Back

It is certified that error appears in the above-identified patent and that said Letters Patent is hereby corrected as shown below:

Claim 1, Column 44, Line 36 should read-- are a radical of the benzene or naphthalene series which --.

Claim 13, Column 46, Line 44 should read-- hydroxyl-containing material is a polyamide. --.

Signed and Sealed this

Eighth Day of October 1985

[SEAL]

Attest:

DONALD J. QUIGG

Attesting Officer

Commissioner of Patents and
Trademarks—Designate